(12) United States Patent  (10) Patent No.: US 6,643,458 B2
Sakamoto  (45) Date of Patent: Nov. 4, 2003

(54) IMAGE PICKUP APPARATUS AND METHOD OF CONTROLLING SAME

(75) Inventor: Shohei Sakamoto, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/288,905

(22) Filed: Nov. 6, 2002

(65) Prior Publication Data
US 2003/0095798 A1 May 22, 2003

(30) Foreign Application Priority Data
Nov. 16, 2001 (JP) ....................... 2001-351942

(51) Int. Cl.⁷ .................. G03B 17/04; H04N 5/225
(52) U.S. Cl. .................. 396/76; 396/87; 396/280; 396/301; 396/349; 396/90; 396/129
(58) Field of Search ............... 396/76, 77, 87, 396/349, 90, 129, 280, 301; 348/240.3, 372, 373, 376

(56) References Cited

U.S. PATENT DOCUMENTS

| 4,142,788 A | * | 3/1979 | Matsumoto et al. | ........ 396/129 |
| 5,347,333 A | * | 9/1994 | Takahashi | ..................... 396/85 |
| 5,802,405 A | * | 9/1998 | Sugimoto | ............... 396/129 X |
| 5,819,120 A | * | 10/1998 | Hamada et al. | ......... 396/349 X |
| 6,393,217 B1 | * | 5/2002 | Takanashi | ..................... 396/77 |
| 6,430,369 B2 | * | 8/2002 | Lee et al. | ..................... 396/87 |

* cited by examiner

Primary Examiner—W. B. Perkey
(74) Attorney, Agent, or Firm—Frishauf, Holtz, Goodman & Chick, P.C.

(57) ABSTRACT

There is disclosed an image pickup apparatus having a lens barrel which is sinkable into the apparatus body, and is controlled, if necessary, not to sink into the body even when the power is switched off The image pickup apparatus has a power key which switches on/off the power in accordance with a key operation, an instruction key which instructs a power source off state in which the lens barrel does not sink into the body, a storage unit which stores positions of lenses constituting a lens optical system when an instruction is given by the instruction key, and a control unit which switches off the power without sinking the lens barrel into the body in accordance with an instruction by the instruction key, and checks or adjusts positions of the lenses based on the positions stored in the storage unit when the power is switched on.

15 Claims, 5 Drawing Sheets

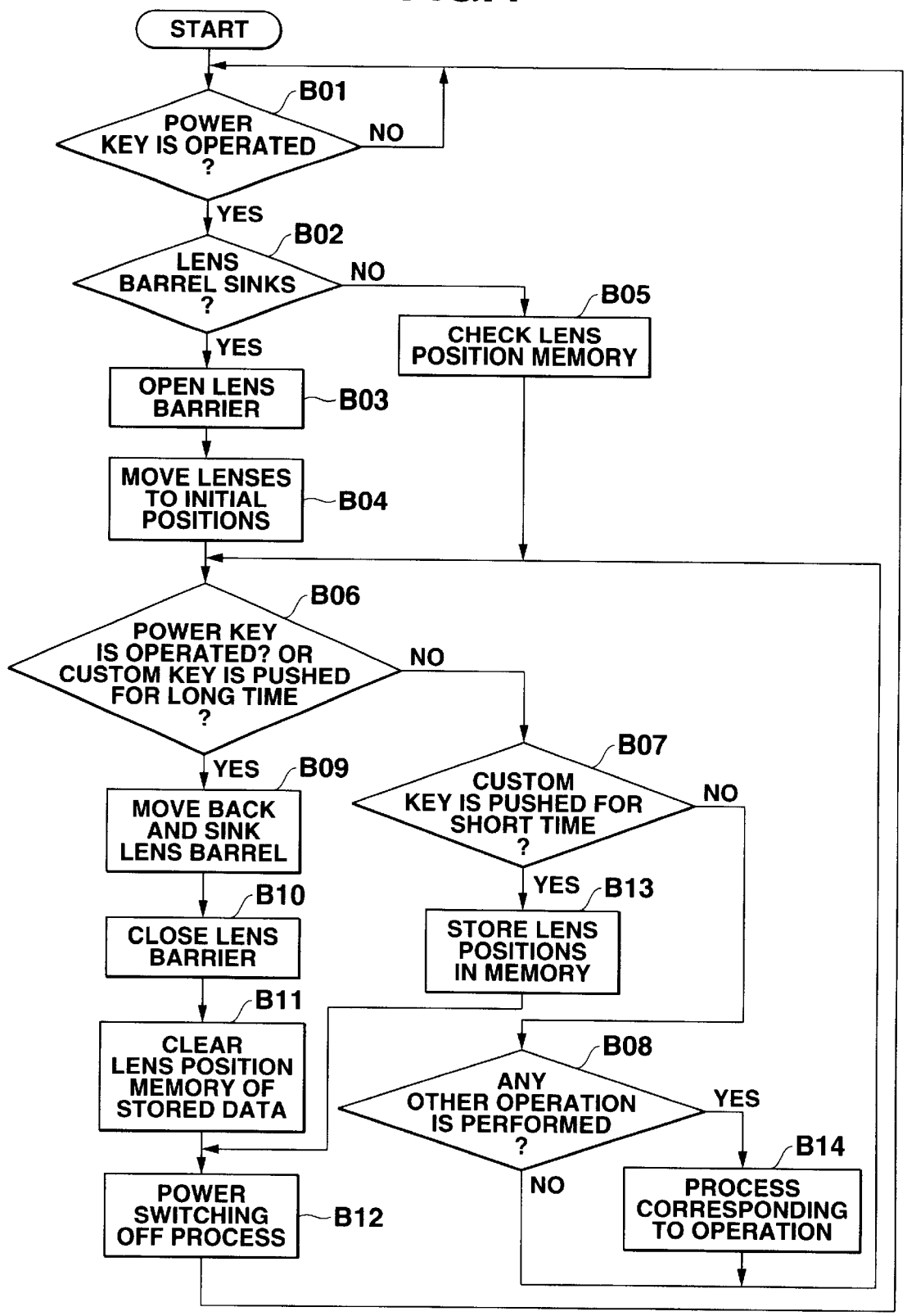

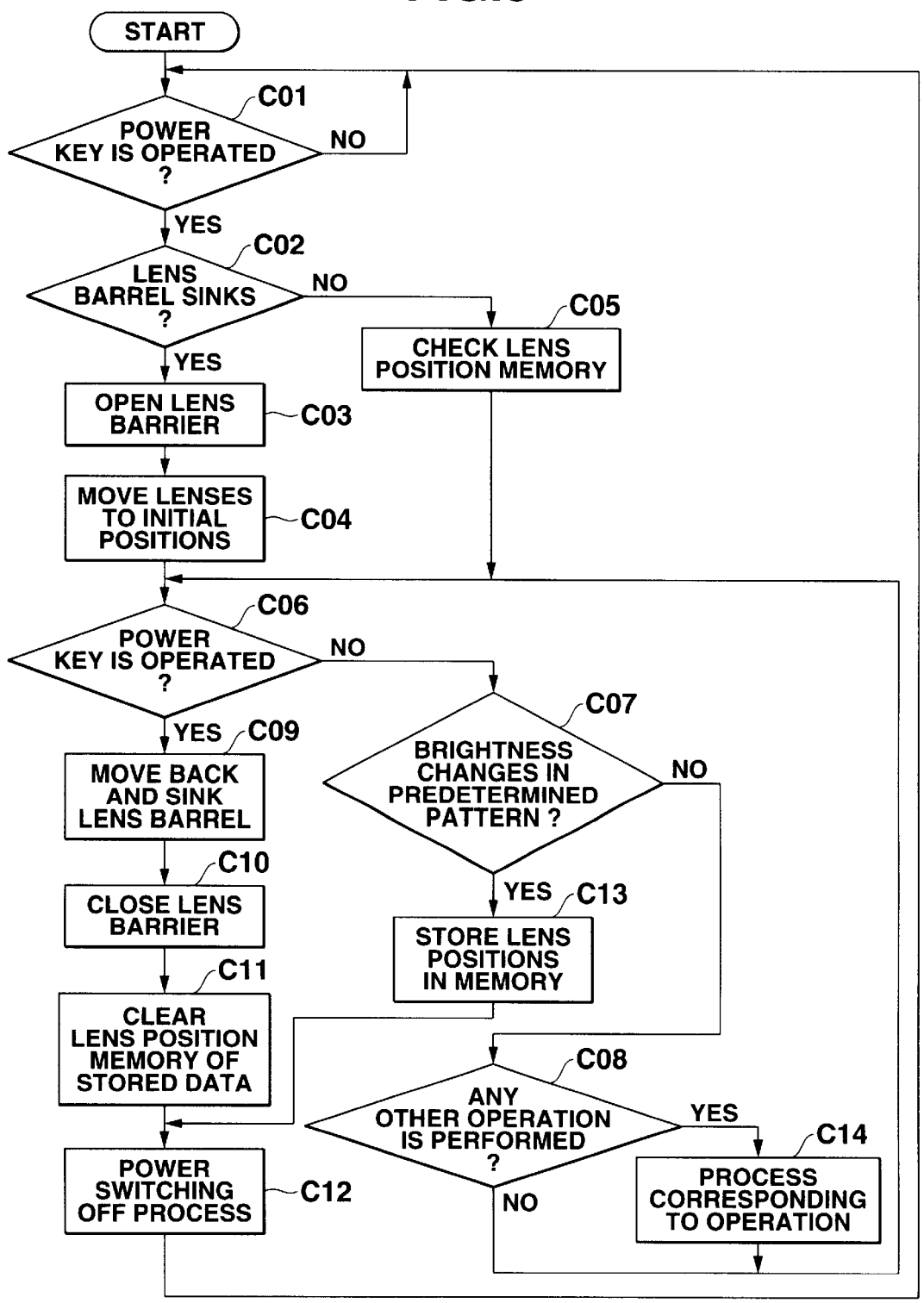

IMAGE PICKUP APPARATUS AND METHOD OF CONTROLLING SAME

BACKGROUND OF THE INVENTION

1. Field of the Invention

The present invention relates to an image pickup apparatus whose lens barrel sinks into the body of the image pickup apparatus.

2. Description of the Related Art

There have existed cameras whose lens barrel sinks partially or entirely into the camera body. The technique of sinking a lens barrel partially or entirely into the camera body is employed mainly in a camera of a compact type, whether it is a camera using a silver film or a digital camera, with a view to ensuring its portability when it is not used for photo-taking, as well as to preventing the lens from being broken carelessly or from being stained.

SUMMARY OF THE INVENTION

The invention recited in claim 1 is an image pickup apparatus comprising:

a power source switch key for switching on/off a power source;

an instruction key which instructs an off state in which the power source is switched off while a lens barrel does not sink into a body of the image pickup apparatus;

a storage unit which stores a position at which the lens barrel is placed when the instruction is operated; and a control unit which controls the power source to be switched off without sinking the lens barrel into the body in accordance with the instruction key, and as well checks or adjusts a position of the lens barrel based on the position stored in the storage unit when the power source is switched on with an operation to the power source switch key.

BRIEF DESCRIPTION OF THE DRAWINGS

These objects and other objects and advantages of the present invention will become more apparent upon reading of the following detailed description and the accompanying drawings in which:

FIG. 4 is a flowchart showing a process for controlling a position of a lens barrel in accordance with an on/off state of a power source, according to a digital still camera according to a second embodiment of the present invention; and FIG. 5 is a flowchart showing a process for controlling a position of a lens barrel in accordance with an on/off state of a power source, according to a digital still camera according to a third embodiment of the present invention.

DETAILED DESCRIPTION OF THE PREFERRED EMBODIMENTS

First Embodiment

A first embodiment where the present invention is applied to a digital still camera (hereinafter referred to as "digital camera") which comprises a zoom lens, will be explained with reference to the drawings.

Figure 1A:
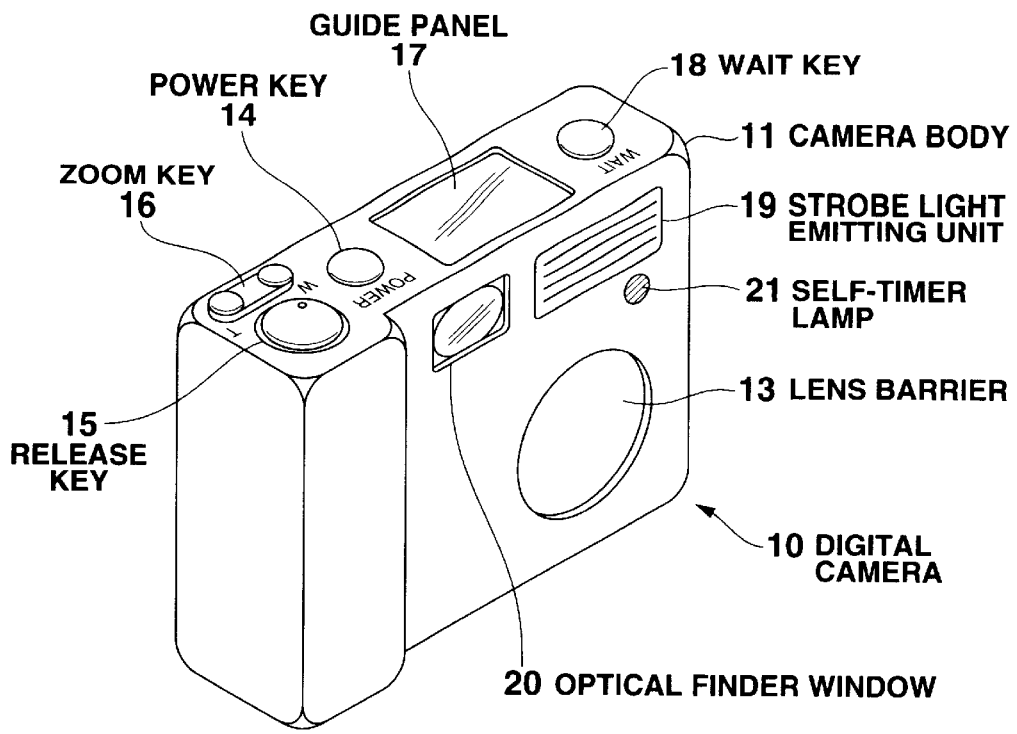
FIGS. 1A and 1B show appearances of a digital still camera according to a first embodiment of the present invention.
Figure 1B:
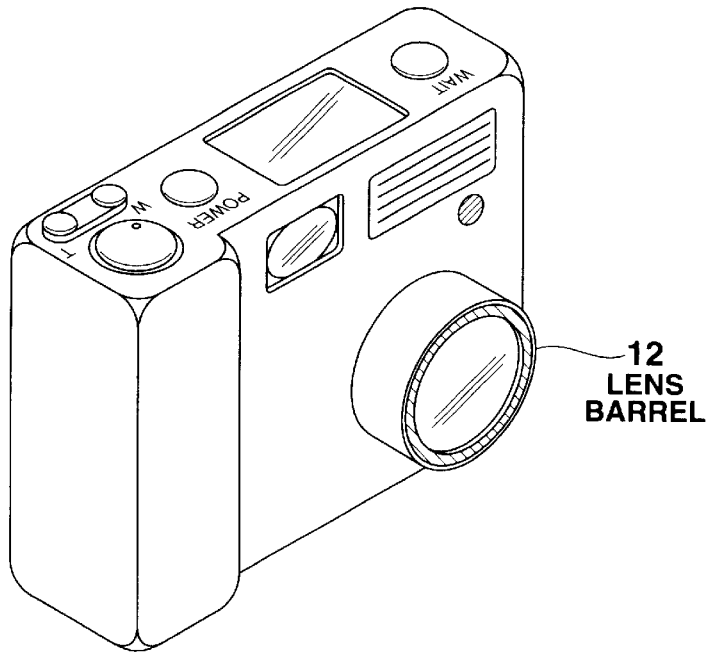

FIGS. 1A and 1B are diagrams showing appearances of a digital camera 10 according to the first embodiment. FIG. 1A shows a state of the digital camera 10 where a lens barrel 12 completely sinks into a camera body 11, and its opening is closed with a lens barrier 13. FIG. 1B shows a state of the digital camera 10 where the lens barrier 13 is opened and the lens barrel 12 sticks out forward from the camera body 11. If the digital camera 10 is switched on while being in the state of FIG. 1B, it can take a picture.

As shown, on the top surface of the camera body 11, there are provided a power key 14, a release key 15, a zoom key 16, a guide panel 17, and a wait key 18.

The power key 14 switches on/off the power source. The release key 15 functions as a shutter key when in a recording mode, as well as a select/execute key when menu items corresponding to some operational modes are displayed.

The zoom key 16 is constituted by two keys arranged in a seesaw state. When one of the two keys is continuously operated, the focus of the lens barrel 12 continuously changes within a predetermined range from a telephoto end to a wide-angle end, or from the wide-angle end to the telephoto end.

The guide panel 17 comprises a liquid crystal display panel of a monochrome type and a back-lighting mechanism for the display panel, for example. The guide panel 17 shows a current consumption degree of a battery as the power source, the content of an operational mode now being selected, a recording state of a flash memory (described later) for storing image data of a taken image, an image quality now being selected, etc.

The wait key 18 is used for switching off the power without sinking the lens barrel 12 into the camera body 11, and is operated by a user when the power is on.

On the front surface of the camera body 11, there are provided a strobe light emitting unit 19, an optical finder window 20, and a self-timer lamp 21, in addition to the lens barrel 12 and the lens barrier 13.

Further, although not especially illustrated, on the back of the camera body 11, there are provided an optical finder, a record/playback switch key, a menu key, a cursor key for selecting a displayed menu item or the like, a custom key to which a user can arbitrarily assign a function, a liquid crystal monitor, etc.

The record/playback switch key is a key for switching a recording mode and a playback mode. The menu key is a key for displaying menu (items) corresponding to operational modes.

The cursor key is a key for selecting a displayed item. The liquid crystal monitor is constituted by a color liquid crystal display panel having a backlight, and when in a recording mode, it displays an image to be recorded. In addition, the liquid crystal monitor displays a state where an operational mode is selected by the menu key.

The custom key has a function which is arbitrarily assigned by a user. Setting of such a function is performed in advance by a user's predetermined key operation in a customizing (user setting) mode. After setting, the assigned function is available, by a single operation of the custom key without the bothersome mode setting and selecting operations.

Next, the structures of electronic circuit built in the camera body 11 will be mainly explained with reference to FIG. 2.

Figure 2:
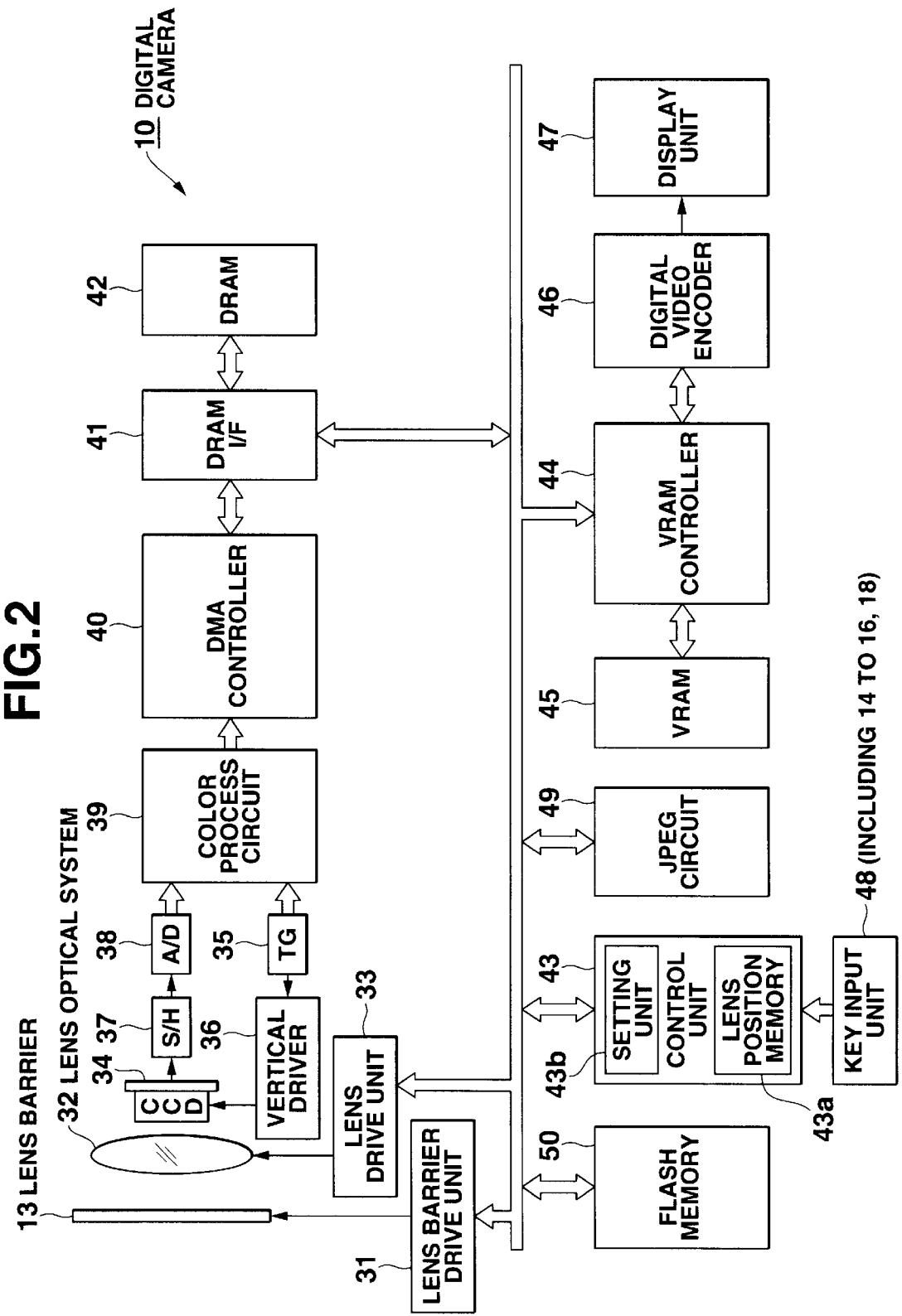
FIG. 2 is a block diagram showing structures of electronic circuits according to the first embodiment.

In FIG. 2, the lens barrier 13 is opened or closed by driving of a lens barrier drive unit 31. A lens optical system 32 which constitutes the lens barrel 12 is moved toward a taking position for taking an image by a lens drive unit 33, while the lens barrier 13 is opened.

The lens optical system 32 includes a zoom lens and a focus lens, detailed explanation of which are omitted. The sticking-out/sinking of the lens barrel 12 and positions of the zoom lens and focus lens are controlled by the lens drive unit 33 which is constituted by a motor and some gear mechanisms.

In an image pickup state where the lens barrel 12 is arranged at a taking position, an optical image of a photo subject is created on a CCD 34 which is an image pickup device placed at the rear of the lens optical system 32 on a light path.

The CCD 34 is driven by a timing generator (TG) 35 and a vertical driver 36, and outputs conversion signals, which are created by opto-electric conversion, corresponding to one screen at regular intervals.

Those conversion signals are analog signals corresponding to R, G, and B (red, green, and blue) color components respectively, and a gain of each of the conversion signals is adjusted by an AGC amp (not illustrated). Afterwards, those conversion signals are sampled and held by a sample hold circuit (S/H) 37, and converted into digital data by an A/D converter (A/D) 38. Then, the digital data is subjected to a color process including an interpolation process and gamma correction by a color process circuit 39, and then output to a DMA (Direct Memory Access) controller 40 as a luminance signal Y and color difference signals Cb and Cr all of which are digital signals.

The DMA controller 40 once writes the luminance signal Y and the color difference signals Cb and Cr output from the color process circuit 39 in a buffer inside the DMA controller 40, using a synchronization signal, a memory writing enable signal, and a clock signal which are also supplied from the color process circuit 39. Then, the DMA controller 40 transfers the written luminance signal Y and color difference signals Cb and Cr to a DRAM (Dynamic Random Access Memory) 42 through a DRAM interface (I/F) 41 in a DMA manner.

A control unit 43 comprises a CPU (Central Processing Unit), a ROM (Read Only Memory) which stores an operational program, a RAM (Random Access Memory) which is prepared as a work memory, etc. After the luminance signal Y and the color difference signals Cb and Cr are transferred in a DMA manner, the control unit 43 reads out those luminance signal Y and color difference signals Cb and Cr from the DRAM 42 via the DRAM interface 41, and writes those in a VRAM (Video Random Access Memory) 45 via a VRAM controller 44.

Further, the control unit 43 comprises a lens position memory 43A and a setting unit 43B. The lens position memory 43A stores positions and focal lengths of the zoom lens and focus lens of the lens optical system 32 which constitutes the lens barrel 12. The setting unit 43B sets a power-off state where the lens barrel 12 does not sink into the camera body 11.

The lens position memory 43A is constituted as a part of the RAM which constitutes the control unit 43, and retains the stored data by backup power source. Or, the lens position memory 43A is constituted by another non-volatile memory than the RAM. Due to this, the stored data in the lens position memory 43A is retained all the time regardless of whether the power of the digital camera 10 is on or off.

A digital video encoder 46 which is connected to the VRAM controller 44 regularly reads out the luminance signal Y and the color difference signals Cb and Cr from the VRAM 45 through the VRAM controller 44. Then, the digital video encoder 46 generates a video signal based on the read luminance signal Y and color difference signals Cb and Cr, and outputs the generated video signal to a display unit 47.

The display unit 47 is constituted by a TFT (Thin Film Transistor) liquid crystal panel with a backlight for example, and is arranged at the back of the camera body 11 so as to constitute the aforementioned liquid crystal monitor. The display unit 47 functions as an EVF (Electronic View Finder) when in a recording mode, and performs a display operation in accordance with a video signal supplied from the digital video encoder 46. Thus, the display unit 47 real-time displays an image which is obtained based on image data (the luminance signal Y and the color difference signals Cb and Cr) which is acquired by the digital video encoder 46 through the VRAM controller 44.

While images are real-time displayed on the display unit 47 as monitor images, if the user operates the release key 15 constituting a key input unit 48 at a timing at which an image which the user wants to record is displayed, the key input unit 48 generates a trigger signal.

In response to this trigger signal, the control unit 43 shuts off the path between the CCD 34 and the DRAM 42 immediately after the DMA transfer performed at this timing from the CCD 34 to the DRAM 42 of the luminance signal Y and color difference signals Cb and Cr corresponding to one screen is completed, and shifts to a recording state. In this recording state, the control unit 43 reads out one frame of each of the luminance signal Y and color difference signals Cb and Cr from the DRAM 42 through the DRAM interface 41 in the units of a so-called basic block made of vertical 8 pixels×horizontal 8 pixels, and writes the one frame of the luminance signal Y and color difference signals Cb and Cr in a JPEG (Joint Photograph coding Experts Group) circuit 49. The control unit 43 controls the JPEG circuit 49 to compress the written luminance signal Y and color difference signals Cb and Cr in accordance with ADCT (Adaptive Discrete Cosine Transform), Huffman coding method which is an entropy coding method, etc. The control unit 43 reads out coded data obtained by compression from the JPEG circuit 49 as a one image data file, and writes the one image data file in a flash memory 50 which is a non-volatile memory confined in a memory card which is a recording medium to be detachably attached to the digital camera 10.

Then, as the compression of the one frame of the luminance signal Y and color difference signals Cb and Cr and writing of those in the flash memory 50 are complete, the control unit 43 opens the path between the CCD 34 and the DRAM 42 again.

Along with this operation, the control unit 43 generates image data by greatly thinning out the number of pixels composing the original image data, and stores the generated image data as a preview image called thumbnail image in the flash memory 50 in association with the original image data.

The aforementioned key input unit 48 comprises not only the release key 15, but also the power key 14, the zoom key 16, the wait key 18, the record/playback switch key, a mode key, the cursor key, and the select/execute key, and directly transmits a signal corresponding to a key operated by a user to the control unit 43.

In the playback mode, the control unit 43 shuts off the path between the CCD 34 and the DRAM 42. Then, in response to a signal output from the key input unit 48 along with user's operations of the cursor key, etc., the control unit 43 reads out specific one frame of the coded data from the flash memory 50 and writes the read data in the JPEG circuit 49, so as to control the JPEG circuit 49 to expand the coded data. The control unit 43 stores YUV data obtained by expansion in the VRAM 45 through the VRAM controller 44 in the units of a basic block of vertical 8 pixels× horizontal 8 pixels.

When the one frame of the YUV data is stored in the VRAM 45, the digital video encoder 46 generates a video signal based on the one frame of the YUV data stored in the VRAM 45, and outputs the generated video signal to the display unit 47. Due to this, an image represented by the generated video signal is displayed on the display unit 47.

Next, the operation of the digital camera 10 according to the present invention will be explained.

Here, it is assumed that the power will be switched off without sinking the lens barrier 13 after the position and focal length of each lens included in the lens optical system 32 constituting the lens barrel 12 are stored in the lens position memory 43A, in a case where the power is switched off by operating the wait key 18, and in a case where the power is switched off by operating the power key 14 while the "wait" mode is set.

Figure 3:
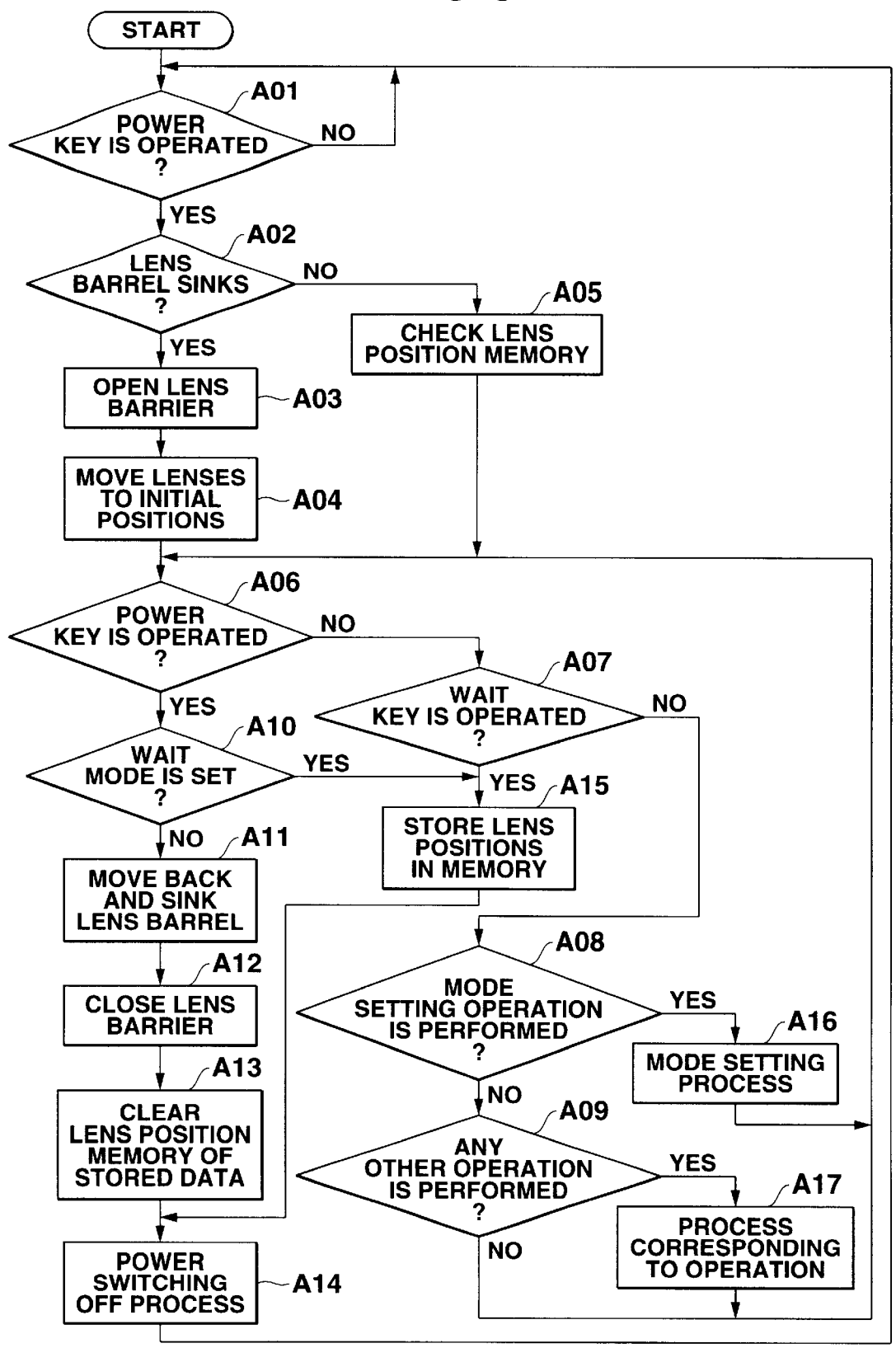
FIG. 3 is a flowchart showing a process for controlling a position of a lens barrel in accordance with an on/off state of a power source according to the first embodiment.

FIG. 3 shows a process for controlling the position of the lens barrel 12 in accordance with the on/off state of the power source, which process is mainly performed by the control unit 43.

At the beginning of this process, the control unit 43 waits for an instruction for switching on the power to be given by operating the power key 14 constituting the key input unit 48 (step A01).

Then, when the control unit 43 determines that the power key 14 is operated and switching on of the power is instructed, the control unit 43 determines whether or not the lens barrel 12 sinks into the camera body 11 by checking whether the positions of the lenses included in the lens optical system 32 are stored in the lens position memory 43A (step A02).

In a case where it is determined that the positions of the lenses included in the lens optical system 32 are not stored in the lens position memory 43A, i.e., that the lens barrel 12 sinks into the camera body 11, the control unit 43 opens the lens barrier 13 by controlling the lens barrier drive unit 31 (step A03), and afterwards, moves the lenses included in the lens optical system 32 toward predetermined initial positions by controlling the lens drive unit 33 (step A04).

In a case where it is determined in step A02 that the positions of the lenses included in the lens optical system 32 are stored in the lens position memory 43A, i.e., that the lens barrel 12 does not sink into the camera body 11, the control unit 43 checks whether the lenses included in the lens optical system 32 are at the positions which is represented by the data (positions and focal lengths) stored in the lens position memory 43A. In a case where the lenses are not at the represented positions, the control unit 43 controls the lens drive unit 33 to move the lenses of the lens optical system 32 back to the positions at which the lenses were when the power was switched off based on the data stored in the lens position memory 43A (step A05).

In the state where the power is switched on and the lens barrel 12 is stuck out to the position suitable for taking a photo, the control unit 43 determines whether or not the power key 14 of the key input unit 48 is operated (step A06), whether or not the wait key 18 is operated (step A07), whether or not a mode setting operation with the menu key and the cursor key are performed (step A08), and whether or not any other operation is performed (step A09). The control unit 43 repeats those determinations. Due to those determinations, the control unit 43 waits for one of those operations to be performed.

In a case where it is determined in step A08 that a mode setting operation with the menu key and the cursor key is performed, the control unit 43 changes the current operational mode to another operational mode corresponding to this mode setting operation (step A16), and returns to the waiting state starting at step A06.

In a case where it is determined in step A09 that any other operation is performed, the control unit 43 performs a process corresponding to this operation (step A17), and returns to the waiting state starting at step A06.

In a case where it is determined in step A06 that the power key 14 is operated, the control unit 43 successively determines whether or not a wait mode is set at this time (step A10).

In a case where it is determined that the wait mode is not set, the control unit 43 moves back the lens barrel 12 from the photo taking position so as to sink into the camera body 11 in response to the operation of the power key 14 (step A11). Then, the control unit 43 closes the lens barrier 13 as shown in FIG. 1A (step A12), and completely clears off the data in the lens position memory 43A (step A13).

Then, the control unit 43 stops supplying power to each circuit included and switches off the power (step A14), and returns to step A01 and waits for the power key 14 to be operated again.

In a case where it is determined in step A10 that the wait mode is set when the power key 14 is operated, the control unit 43 updates the lens position memory 43A to newly store the positions and focal lengths of the lenses of the lens optical system 32 at this timing (step A15). After this, the control unit 43 skips steps A11 to A13 and performs the process for stopping supplying power to each circuit and switching off the power without sinking the lens barrel 12 into the camera body 11 (step A14). Then, the control unit 43 returns to step A01 and waits for the power key 14 to be operated again.

Further in a case where it is determined in step A07 that the wait key 18 is operated; the control unit 43 performs the same thing as the above case where the power key 14 is operated while the wait mode is set. That is, the control unit 43 updates the lens position memory 43A to newly store the positions and focal lengths of the lenses of the lens optical system 32 at this timing (step A15), skips steps A11 to A13, and performs the process for stopping supplying power to each circuit and switching off the power without sinking the lens barrel 12 into the camera body 11 (step A14). Then, the control unit 43 returns to step A01 and waits for the power key 14 to be operated again.

As described above, the power is switched off without sinking the lens barrel 12 into the camera body 11, in response to an operation for switching off the power which is different from an ordinary operation for switching off the power, such as when the power key 14 is operated while the wait mode is set and when the wait key 18 which is prepared independently from the power key 14 is operated.

Accordingly, even if the power is often switched off to prevent wasteful consumption of the battery which supplies power, there is no need of performing again a process of sticking out the lens barrel 12 to the desired position when the user switches on the power the next time. As a result, since the user can quickly move on to the photo-taking action, he/she can start photo-taking without missing a shutter chance.

Further, the digital camera 10 according to the present invention has a zoom lens whose focal length successively changes, likewise a recent standard digital still camera. And the control unit 43 stores the focal length of the zoom lens in the lens position memory 43A at the timing when an instruction for switching off the power is given. The next time when the power is on, the control unit 43 checks or adjusts the position of the zoom lens based on the stored focal length.

Accordingly, when the power is switched on the next time, there is no need of performing the redundant setting process of returning the position of the zoom lens to the position before the power was switched off. Thus, the user can start photo-taking right after the power is switched on.

Further, the wait key 18 is prepared independently from the power key 14. By operating this wait key 18, the digital camera 10 can be quickly switched from the power-on state to the power-off state without sinking the lens barrel 12.

In addition, in a case where an instruction for switching off the power is given by operating the power key 14 while the wait mode is set, the power is switched off without sinking the lens barrel 12 into the camera body 11, unlike an ordinary power switching off operation using the power key 14. Therefore, it is possible to reduce the total number of operational keys on the camera, and to simplify the structure of the camera.

Furthermore, the digital camera 10 may have an "auto power off" function, that is, a function for automatically switching off the power of the camera when in the power-on state, no input is given from the key input unit 48 for a preset period of time. It may be possible that the user arbitrarily sets such a period of time, or such a period of time may be a fixed period that is not changed by the user. In this case, a process for determining whether or not the preset period of time has passed is performed before step A06 of the flowchart shown in FIG. 3 where whether or not the power key 14 is operated is determined. In a case where the preset period of time has passed, the control unit 43 performs step A10 for determining whether or not the wait mode is set. The processes after this are the same as those shown in the flowchart of FIG. 3. In a case where the preset period of time has not passed, the control unit 43 performs step A06 for determining whether or not the power key 14 is operated. The processes after this are the same as those shown in the flowchart of FIG. 3.

Even with such an "auto power off" function, the same effect as described above can be obtained.

Second Embodiment

A second embodiment where the present invention is applied to a digital camera having a zoom lens will be explained with reference to the drawings.

The appearance of the digital camera according to the present invention is basically the same as the structures shown in FIGS. 1A and 1B. And the structures of mainly the electric circuits built in the camera body are basically the same as those shown in FIG. 2. Accordingly, components same as those shown in FIGS. 1A and 1B, and FIG. 2 are denoted by the same reference numerals, and illustration and explanation of such components are omitted.

Note that the wait key 18 shown in FIGS. 1A and 1B, and FIG. 2 is not prepared. Instead of this, if the user of the digital camera 10 can assign the same function as the wait key 18 to the aforementioned custom key in the customizing (user setting)-mode, he/she can give the same instruction as that when the wait key 18 is used, with the use of the custom key.

Next, the operation of the digital camera 10 according to the second embodiment will be explained.

Here, it is assumed that in a case where the power is switched off by operating the custom key prepared on the back of the camera body 11 for a predetermined period of time, for example, for a short time of less than 2 seconds, the power will be switched off without sinking the lens barrel 12 with the lens position memory 43A storing the positions and focal lengths at the time of the lenses of the lens optical system 32 constituting the lens barrel 12.

FIG. 4 shows a process for controlling the position of the lens barrel 12 in accordance with the on/off state of the power source, which process is mainly performed by the control unit 43.

At the beginning of this process, the control unit 43 waits for an instruction for switching on the power to be given by operating the power key 14 constituting the key input unit 48 (step B01).

Then, when the control unit 43 determines that the power key 14 is operated and the switching on of the power is instructed, the control unit 43 determines whether or not the lens barrel 12 sinks into the camera body 11 by checking whether the positions of the lenses of the lens optical system 32 are stored in the lens position memory 43A (step B02).

In a case where it is determined that the positions of the lenses of the lens optical system 32 are not stored in the lens position memory 43A, i.e., that the lens barrel 12 sinks into the camera body 11, the control unit 43 opens the lens barrier 13 by controlling the lens barrier drive unit 31 (step B03), and moves the lenses of the lens optical system 32 to predetermined initial positions by controlling the lens drive unit 33 (step B04).

In a case where it is determined in step B02 that the positions of the lenses of the lens optical system 32 are stored in the lens position memory 43A, i.e., that the lens barrel 12 does not sink into the camera body 11, the control unit 43 checks whether or not the lenses of the lens optical system 32 are at the positions represented by the data stored in the lens position memory 43A. In a case where the lenses are not at the represented positions, the control unit 43 controls the lens drive unit 33 to move back the lenses of the lens optical system 32 to the position when the power was switched off, based on the data stored in the lens position memory 43A (step B05).

In the state where the power is switched on and the lens barrel 12 is arranged at the position suitable for taking a photo, the control unit 43 determines whether or not the power key 14 of the key input unit 48 is operated, or whether or not the custom key is operated for a predetermined period of time, for example, for 2 seconds or more (step B06), whether or not the custom key is operated for a predetermined period of time, for example, for a short time of less than 2 seconds (step B07), and whether or not any other operation is performed (step B08). The control unit 43 repeats those determinations. Due to this, the control unit 43 waits for any one of those operations to be performed.

In a case where it is determined in step B08 that any other operation is performed, the control unit 43 performs a process corresponding to the operation (step B14), and returns to the waiting state starting at step B06.

In a case where it is determined in step B06 that the power key 14 is operated, or that the custom key is operated for a predetermined period of time, for example, for 2 seconds or more, the control unit 43 moves back the lens barrel 12 from the photo-taking position so as to sink into the camera body 11 in response to the operation (step B09).

Then, the control unit 43 closes the lens barrier 13 as shown in FIG. 1A (step B10), and clears the lens position memory 43A of the stored data (step B11).

Then, the control unit 43 performs a process for stopping supplying power to each circuit and switching off the power (step B12), and returns to step B01 and waits for the power key 14 to be operated again.

In a case where it is determined in step B07 that the custom key is operated for a predetermined period of time, for example, for a short time of less than 2 seconds, the control unit 43 updates the lens position memory 43A to newly store the positions and focal lengths of the lenses of the lens optical system 32 at this timing (step B13). After this, the control unit 43 skips step B09 to B11, and performs a process for stopping supplying power to each circuit and switching off the power without sinking the lens barrel 12 into the camera body (step B12). Then, the control unit 43 returns to step B01 and waits for the power key 14 to be operated again.

As explained above, it is possible to give an instruction not to sink the lens barrel 12 when switching off the power, in accordance with whether a predetermined key is pushed for a longer time or for a shorter time. Therefore, in a case where the user can set the above described function to an arbitrary key in the customizing (user setting) mode of the camera, it is possible to assign the above function to another key than the power key 14 for switching on/off the power. Therefore, it is unnecessary to prepare a special-purpose key such as the wait key 18 explained in the first embodiment, and it is possible to more simplify the structure of the camera.

According to the second embodiment, an instruction not to sink the lens barrel 12 into the camera body 11 when switching off the power is given in accordance with whether the custom key is pushed for a longer time or a shorter time. However it is possible to give the instruction in accordance with whether or not the power key 14 is pushed for a longer time or a shorter time, rather than the custom key. Specifically, the control unit 43 determines in step B06 whether or not the power key 14 is operated for, for example, 2 seconds or more. In a case where the power key 14 is operated for 2 seconds or more, the control unit 43 moves back the lens barrel 12 from the photo-taking position so as to sink into the camera body 11 (step B09), and after this, performs processes in accordance with the flowchart shown in FIG. 4. In a case where the power key 14 is operated for a short time of less than 2 seconds, the control unit 43 goes to step B13 and thereafter performs processes in accordance with the flowchart shown in FIG. 4. Needless to say, it is possible that the condition that the power key 14 is operated for a longer time and the condition that the power key 14 is operated for a shorter time are reversed when the control unit 43 determines which of steps B09 and B13 to go to.

If the digital camera 10 is structured as described above, it is possible to switch off the power without sinking the lens barrel 12 into the camera body 11 with only the power key 14, without using the custom key. Therefore, it is possible to assign another function than the function to switch off the power to the custom key, and thus to more simplify the structure of the digital camera 10.

Third Embodiment

A third embodiment where the present invention is applied to a digital camera having a zoom lens will be explained below with reference to the drawings.

The outer structure of the digital camera according to the present invention is basically the same as those shown in FIGS. 1A and 1B. The structures of mainly electronic circuits built in the camera body are basically the same as those shown in FIG. 2. Accordingly, components same as those shown in FIGS. 1A and 1B, and FIG. 2 are denoted by the same reference numerals, and illustration and explanation of such components are omitted.

Note that the wait key 18 shown in FIGS. 1A and 1B, and FIG. 2 is not prepared. Instead of this, the control unit 43 monitors the brightness of an optical image obtained via the lens optical system 32 all the time when the power is switched on, and detects changes of the brightness of the optical image in a predetermined pattern, for example, from "bright" to "dark" to "bright" to "dark" to "bright". The user of the digital camera 10 can give an instruction same as that when the wait key 18 is used, by changing the brightness of the optical image in a predetermined pattern by covering the lens barrel 12 with a hand, etc. for a predetermined period of time.

Next, the operation of the digital camera 10 according to the third embodiment will be explained.

Here, it is assumed that in a case where the user of the digital camera 10 covers the front of the lens barrel 12 with a hand, etc. when in the photo-taking state, and thus the brightness of an obtained optical image changes in a predetermined pattern such as from "bright" to "dark" to "bright" to "dark" to "bright", the power of the digital camera 10 will be switched off without sinking the lens barrel with the lens position memory 43A storing the positions and focal lengths at this timing of the lenses of the lens optical system 32 constituting the lens barrel 12.

FIG. 5 shows a process for controlling the position of the lens barrel 12 in accordance with the on/off state of the power source, which process is mainly performed by the control unit 43 in a state where the power is switched off.

At the beginning of this process, the control unit 43 waits for an instruction for switching on the power to be given by operating the power key 14 constituting the key input unit 48 (step C01).

Then, when the control unit 43 determines that the power key 14 is operated and that switching on of the power is instructed, the control unit 43 determines-whether or not the lens barrel 12 sinks into the camera body 11 by checking whether the positions of the lenses of the lens optical system 32 are stored in the lens position memory 43A (step C02).

In a case where it is determined that the positions of the lenses of the lens optical system 32 are not stored in the lens position memory 43A, i.e., that the lens barrel 12 sinks into the camera body 11, the control unit 43 opens the lens barrier 13 by controlling the lens barrier drive unit 31 (step C03), and moves the lenses of the lens optical system 32 to predetermined initial positions by controlling the lens drive unit 33 (step C04).

In a case where it is determined in step C02 that the positions of the lenses of the lens optical system 32 are stored in the lens position memory 43A, i.e., that the lens barrel 12 does not sink into the camera body 11, the control unit 43 checks whether or not the lenses of the lens optical system 32 are at the positions represented by the data stored in the lens position memory 43A. In a case where the lenses are not at the represented positions, the control unit 43 controls the lens drive unit 33 to move the lenses of the lens optical system 32 to the positions when the power was switched off based on the data stored in the lens position memory 43A (step C05).

In the state where the power is switched on and the lens barrel 12 is arranged at the position suitable for taking a photo, the control unit 43 determines whether or not the power key 14 of the key input unit 48 is operated (step C06), whether or not the monitored brightness of the photo-subject image changes in the aforementioned pattern (step C07), and whether or not any other operation is performed (step C08). The control unit 43 repeats those determination. By those determination, the control unit 43 waits for any one of those operations to be performed.

In a case where it is determined in step C08 that any other operation is performed, the control unit 43 performs a process corresponding to the operation (step C14), and returns to the waiting state starting at step C06.

In a case where it is determined in step C06 that the power key 14 is operated, the control unit 43 moves back the lens barrel 12 from the photo-taking position so as to sink into the camera body 11 (step C09). Then, the control unit 43 closes the lens barrier 13 as shown in FIG. 1A (step C10), and clears the lens position memory 43A of the stored data (step C11).

Then, the control unit 43 performs a process for stopping supplying power to each circuit and switching off the power (step C12), and returns to step C01 to wait for the power key 14 to be operated again.

In a case where it is determined in step C07 that the monitored brightness of the photo-subject image changes in the aforementioned predetermined pattern, the control unit 43 updates the lens position memory 43A to newly store the positions and focal lengths at this timing of the lenses of the lens optical system 32 in the lens position memory 43A (step C13). After this, the control unit 43 skips step C09 to C11, and directly performs the process for stopping supplying power to each circuit and switching off the power without sinking the lens barrel 12 into the camera body 11 (step C12). Then, the control unit 43 returns to step C01 and waits for the power key 14 to be operated again.

As described above, it is possible to give an instruction not to sink the lens barrel 12 when switching off the power, in accordance with a pattern of changes in the brightness of a photo-subject image, which are caused by shutting out external light coming into the lens optical system 32 for a predetermined period of time. Therefore, it is unnecessary to prepare another key than the power key 14 for switching on/off the power, and thus the structure of the camera can be more simplified.

In any of the first to third embodiments, a case where the present invention is applied to a digital still camera is explained. However, the present invention is not to limited to a digital still camera, but can be applied to any camera apparatus that has a lens barrel which partially or entirely sinks into the camera body, whether such a camera is a camera using a silver film, or an analog/digital video camera, or the like.

In addition, the present invention is not limited to the above described embodiments, but can be variously modified and carried out within the meaning of the present invention.

Further, the above described embodiments include inventions of various stages. Therefore, by appropriately combining the plurality of constitutional elements disclosed herewith, various inventions can be extracted. For example, in a case where at least one of the problems to be solved by the present invention can be solved and at leas one of the above described effects can be obtained even if some of the constitutional elements are removed from all of the constitutional elements shown in the embodiments, a structure which does not comprise such constitutional elements can be extracted as an invention.

This application is based on Japanese Patent Application No. 2001-351942 filed on Nov. 16, 2001 and including specification, claims, drawings and summary. The disclosure of the above Japanese Patent Application is incorporated herein by reference in its entirety.

What is claimed is:

1. An image pickup apparatus comprising:
    a power source switch key for switching on/off a power source;
    an instruction key which instructs an off state in which the power source is switched off while a lens barrel does not sink into a body of the image pickup apparatus;
    a storage unit which stores a position at which the lens barrel is placed when the instruction key is operated; and
    a control unit which controls the power source to be switched off without sinking the lens barrel into the body in accordance with an instruction of the instruction key, and as well checks or adjusts a position of the lens barrel based on the position stored in the storage unit in a case where the power source is switched on with an operation to the power source switch key.

2. The image pickup apparatus according to claim 1, wherein:
    the lens barrel comprises a zoom lens whose focal length successively changes;
    the storage unit stores the focal length of the zoom lens as well; and
    the control unit checks or adjusts a position of the zoom lens based on the focal length stored in the storage unit in a case where the power source is switched on.

3. The image pickup apparatus according to claim 1, further comprising
    a setting unit which sets the off state in which the power source is switched off while the lens barrel does not sink into the body of the image pickup apparatus,
    wherein the control unit controls the power source to be switched off without sinking the lens barrel into the body, in a case where an operation for switching off the power source by the power source switch key is performed after setting by the setting unit is performed.

4. The image pickup apparatus according to claim 1, wherein the instruction key is a key which is prepared independently from the power source switch key.

5. The image pickup apparatus according to claim 1, wherein the control unit controls the power source to be switched off without sinking the lens barrel into the body, in a case where a state in which none of keys included is operated lasts for a predetermined period of time when the power source is on.

6. The image pickup apparatus according to claim 1, wherein the control unit controls the power source to be switched off without sinking the lens barrel into the body, in accordance with a period of time during which a predetermined key is operated.

7. The image pickup apparatus according to claim 1, wherein the control unit controls the power source to be switched off without sinking the lens barrel into the body, in accordance with a period of time during which the power source switch key is operated.

8. An image pickup apparatus comprising:
    a power source switch key for switching on/off a power source;

a setting unit which sets an off state in which the power source is switched off while a lens barrel does not sink into a body of the image pickup apparatus;

a storage unit which stores a position at which the lens barrel is placed; and a control unit which controls the power source to be switched off without sinking the lens barrel into the body in a case where setting by the setting unit is performed, and as well checks or adjusts a position of the lens barrel based on the position stored in the storage unit in a case where the power source is switched on with an operation to the power source switch key.

9. The image pickup apparatus according to claim 8, wherein the lens barrel comprises a zoom lens whose focal length changes successively;

the storage unit stores the focal length of the zoom lens as well; and the control unit checks or adjusts a position of the zoom lens based on the focal length stored in the storage unit in a case where the power source is switched on.

10. The image pickup apparatus according to claim 8, wherein the control unit controls the power source to be switched off when a state in which none of keys included is operated lasts for a predetermined period of time.

11. The image pickup apparatus according to claim 8, wherein the control unit controls the power source to be switched off with an operation to the power source switch key for switching on/off the power source.

12. An image pickup apparatus comprising:

a control unit which switches off a power source without sinking a lens barrel into a body of the image pickup apparatus, in accordance with a change pattern of changes in brightness of light coming into a lens when the power source is on; and a storage unit which stores a position at which the lens barrel is placed, wherein the control unit switches off the power source without sinking the lens barrel into the body, and as well checks or adjusts a position of the lens barrel based on the position stored in the storage unit in a case where the power source is switched on.

13. The image pickup apparatus according to claim 12, wherein the lens barrel comprises a zoom lens whose focal length changes successively;

the storage unit stores the focal length of the zoom lens as well; and the control unit checks or adjusts a position of the zoom lens based on the focal length stored in the storage unit in a case where the power source is switched on.

14. The image pickup apparatus according to claim 12, wherein the change pattern is a repetition of a bright state and a dark state.

15. A method of controlling an image pickup apparatus, comprising:

a power source switching step of switching on/off a power source of the image pickup apparatus with a key operation;

an instructing step of instructing an off state in which the power source is switched off while a lens barrel does not sink into a body of the image pickup apparatus;

a storing step of storing a position at which the lens barrel is placed when an instruction is given in the instructing step; and a controlling step of controlling the power source to be switched off without sinking the lens barrel into the body in accordance with the instruction given in the instructing step, and as well checking or adjusting a position of the lens barrel based on the position stored in the storing step in a case where the power source is switched on with a key operation in the power source switching step.

* * * * *